United States Patent Office 2,694,721
Patented Nov. 16, 1954

2,694,721

CONDENSATION PRODUCTS OF BIS-CYCLO-PENTADIENYL IRON AND ALDEHYDES

Viktor Weinmayr, Landenberg, Pa., assignor to E. I. du Pont de Nemours and Company, Wilmington, Del., a corporation of Delaware No Drawing. Application October 2, 1952, Serial No. 312,851

11 Claims. (Cl. 260—439)

This invention relates to a new class of stable condensation products containing carbon-iron bonds, and more particularly to condensation products obtained from the reaction of dicyclopentadienyliron with aldehydes.

Organo-metallic compounds in which the metal is directly attached to a hydrocarbon radical make up an important class of compounds. Well-known examples include tetraethyl lead, the universally used anti-knock agent, ethyl mercury compounds which are important as fungicides, and the alkyl and aryl derivatives of magnesium, sodium, lithium and the like which are important in organic syntheses. Until very recently, no corresponding organic compounds of iron were known. The first such compound to be discovered was di-cyclopentadienyliron, which was first disclosed in an article by Kealy and Pauson appearing in Nature 168, 1039 (1951) and is claimed in U. S. application Serial No. 291,567, filed June 5, 1952.

It is an object of the present invention to provide a new class of stable condensation products containing carbon-iron bonds and a convenient process for their preparation. A further object is to provide new water-soluble products containing bonds of this character. Further objects will appear from the description of this invention which follows.

The compounds of this invention are condensation products of dicyclopentadienyliron and an aldehyde, each molecule of said products containing two atoms of iron. They comprise a series of stable, crystalline compounds of moderately high molecular weight, which contain two dicyclopentadienyliron residues probably joined by two methylene or hydrocarbon-substituted methylene bridges, and thought to have the formula:

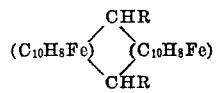

in which R is a member of the class consisting of hydrogen and monovalent hydrocarbon radicals. Their structure probably corresponds to the following formula:

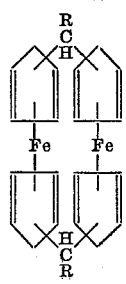

The points of attachment of the methylene bridges to the dicyclopentadienyliron nuclei are not known. According to Wilkinson et al. in J. Am. Soc. 74, 2125 (1952), all of the five positions in each cyclopentadienyl ring in dicyclopentadienyliron are equivalent, so that no isomerism with respect to any one such ring is possible.

The groups represented by R in the formula shown above may be hydrogen or may be any monovalent aliphatic, cycloaliphatic or aromatic hydrocarbon radical. Suitable hydrocarbon radicals include the methyl, ethyl, propyl, isopropyl, hexyl, dodecyl, cyclohexyl, phenyl and tolyl radicals. The nature of R has some effect on the properties of the condensation product but does not significantly influence the course of the reaction by which the products are prepared.

These compounds are readily prepared by condensing at a temperature between 20 and 100° C. an aldehyde having the formula R—CHO, in which R has the significance given above, with dicyclopentadienyliron dissolved in anhydrous liquid hydrogen fluoride, and thereafter reacting the condensation product with a reducing agent. Approximately equal molecular quantities of dicyclopentadienyliron and the aldehyde or a moderate excess of the latter are customarily employed. The same condensation product results, however, when a larger excess of either ingredient is used. Satisfactory results are obtained when employing the reactants in molar proportions ranging from 1:10 to 10:1.

When the aldehyde does not contain too long a carbon chain, for example when R is no more than 10, the reaction product formed from the initial condensation between the aldehyde and the iron compound dissolves in water with the formation of a deep blue ion. The structure of this intermediate condensation product has not yet been established. It is converted to the ultimate condensation product, which is water-insoluble, by the action of zinc dust, iron powder, or other reducing agent able to function in aqueous acid solution. Hydrogen together with a hydrogen catalyst may be used as the reducing agent. The insoluble condensation product may be converted back to the water-soluble form by oxidation in acid solution with air or other oxidizing agent.

The method of preparing the products of this invention is illustrated by the following examples:

Example 1.—Condensation with formaldehyde

A nickel bomb is cooled in ice and charged with 100 grams of technical anhydrous hydrogen fluoride, 5 grams of di-cyclopentadienyliron (M. P. 174° C.), and 1.2 grams of paraformaldehyde. The molar ratio of di-cyclopentadienyliron to formaldehyde is thus 1:1.5. The vessel is closed tightly and agitated in a water bath. The temperature of the water bath is raised to 100° over a period of three hours and held at 100° for three hours. The charge is then cooled in ice and poured into about 1000 grams of cold water. A small amount (1.2 grams) of insoluble material is removed by filtration from the blue solution.

The clear blue filtrate is agitated with 65 grams of zinc dust at room temperature until the blue color has disappeared and a yellow precipitate has formed. This precipitate together with the zinc dust is filtered, washed acid-free and without previous drying extracted with 500 grams of hot benzene. The yellow benzene solution is dried with calcium chloride, filtered, and evaporated on the steam bath. There are obtained 3.4 grams of a light brown, crystalline product melting at 175–178° C., representing 64.2% of the theoretical yield. The compound is soluble in 96% sulfuric acid with a blue green color and can be distilled without decomposition at atmospheric pressure. After two crystallizations from high boiling petroleum ether (boiling range 110–120° C.) using 75 grams of solvent for each crystallization, 2.5 grams of the product, representing a 47.2% yield based on the di-cyclopentadienyliron, are obtained in the form of brown needles melting at 191–192° C. The analysis shows that the compound is formed by the elimination of two water molecules between two molecules of formaldehyde and two molecules of di-cyclopentadienyliron. Analysis, calculated for $C_{22}H_{20}Fe_2$: C, 66.62%; H, 5.05; Fe, 28.37; M. W. 396. Found: C, 66.30; H, 5.56; Fe, 28.37; M. W., 402. The compound is further identified by its infrared spectrum, as measured in mineral oil. Characteristic absorption bands occur at wave-lengths of 9.05, 9.80, 10.03 and 12.22 microns.

Example 2.—Condensation with benzaldehyde

A nickel vessel is cooled in ice and charged with 100 grams of technical anhydrous hydrogen fluoride and 5 grams of dicyclopentadienyliron (M. P. 174° C.). There are added 4.3 grams of benzaldehyde below the boiling point of hydrogen fluoride (20° C.). The molar ratio of di-cyclopentadienyliron to benzaldehyde is thus 1:1.5. The vessel is closed tightly and agitated in a water bath.

The temperature of the bath is raised to 100° C. over a period of three hours and agitation of the charge is continued at 100° C. for three hours. The charge is then cooled in ice and poured into about 1000 grams of water. An insoluble product (4.8 grams) is removed by filtration. The bluish green filtrate is agitated at room temperature with 150 grams of zinc dust until the color of the solution is discharged and a yellow precipitate is formed. This yellow precipitate and the excess of zinc dust are filtered, washed acid-free, and, without drying, extracted with 500 grams of hot benzene. The benzene solution is dried, filtered, and evaporated on a steam bath.

There are obtained 4.7 grams of a bright yellow crystalline product melting at 250–255° C., equal to a yield of 59.5% based on the di-cyclopentadienyliron. After a crystallization from 400 grams of high boiling gasoline (B. R. 110–120° C.), and a second crystallization from 40 grams of xylene, 2.35 grams of pure product corresponding to a yield of 29.8% are obtained. This product melts at 265–268° C. It is soluble in sulfuric acid with a green color. The analysis shows that this product is formed through the condensation between two molecules of dicyclopentadienyliron and two molecules of benzaldehyde with the elimination of two molecules of water. Analysis, calculated for $C_{34}H_{28}Fe_2$: C, 74.7%; H, 5.11; Fe, 20.43; M. W., 548. Found C, 74.53; H, 5.86; Fe, 19.86; M. W., 488. The compound is further identified by its infra-red spectrum as measured in mineral oil. Characteristic absorption bands appear at wavelengths of 9.02, 9.78, 12.33 and 14.11 microns.

The products of this invention are useful as anti-knock agents for spark ignition engines. They are also of utility in the preparation of pigments and in the synthesis of other organic-iron compounds.

I claim:

1. A condensation product of dicyclopentadienyliron and an aldehyde having the formula R—CHO, in which R represents a member of the class consisting of hydrogen and monovalent hydrocarbon radicals, each molecule of said product containing two atoms of iron.

2. A process of preparing a condensation product containing carbon-iron bonds which comprises condensing at a temperature between 20 and 100° C. an aldehyde having the formula R—CHO, in which R represents a member of the class consisting of hydrogen and monovalent hydrocarbon radicals, with dicyclopentadienyliron dissolved in anhydrous liquid hydrogen fluoride, and thereafter reacting the condensation product with a reducing agent.

3. A process according to claim 2 in which the reducing agent is zinc dust.

4. A process according to claim 2 in which the aldehyde is formaldehyde.

5. A process according to claim 2 in which the aldehyde is benzaldehyde.

6. A process for preparing a water-soluble condensation product containing carbon-iron bonds which comprises condensing at a temperature between 20 and 100° C. an aldehyde having the formula R—CHO, in which R represents a member of the class consisting of hydrogen and monovalent hydrocarbon radicals containing no more than 10 carbon atoms, with dicyclopentadienyliron dissolved in anhydrous liquid hydrogen fluoride.

7. A process according to claim 6 in which R represents hydrogen.

8. A process according to claim 6 in which R represents a phenyl radical.

9. A water-soluble condensation product containing carbon-iron bonds obtained by the process of claim 6.

10. A condensation product of dicyclopentadienyliron and formaldehyde, each molecule of said product containing two atoms of iron.

11. A condensation product of dicyclopentadienyliron and benzaldehyde, each molecule of said product containing two atoms of iron.

References Cited in the file of this patent

Kealy et al.: Nature, vol. 168, pages 1039–40, December 15, 1951.

Miller et al.: J. Chem. Soc. (London), February 1952, pages 632–5.

Wilkinson et al.: J. Am. Chem. Soc., vol. 74 (1952), pages 2125–26.